United States Patent
Phillips

(10) Patent No.: US 10,005,329 B2
(45) Date of Patent: Jun. 26, 2018

(54) CAPTIVE PIN APPARATUS FOR RETENTION OF A DRAWBAR IN A TRAILER HITCH RECEIVER

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days. days.

(21) Appl. No.: 15/846,825

(22) Filed: Dec. 19, 2017

(65) Prior Publication Data

US 2018/0105000 A1   Apr. 19, 2018

Related U.S. Application Data

(63) Continuation-in-part of application No. 15/494,808, filed on Apr. 24, 2017, now Pat. No. 9,902,222, and a continuation-in-part of application No. 15/721,770, filed on Sep. 30, 2017, and a continuation-in-part of application No. 15/396,710, filed on Jan. 2, 2017.

(51) Int. Cl.
*B60D 1/02* (2006.01)
*B60D 1/36* (2006.01)

(52) U.S. Cl.
CPC .............. *B60D 1/025* (2013.01); *B60D 1/36* (2013.01)

(58) Field of Classification Search
CPC ................................. B60D 1/025; B60D 1/36
See application file for complete search history.

(56) References Cited

U.S. PATENT DOCUMENTS

| | | |
|---|---|---|
| 3,093,395 A | 6/1963 | Boutwell |
| 3,169,028 A | 2/1965 | Scrivner |
| 3,190,677 A * | 6/1965 | Robbins .................... B60D 1/02 280/515 |
| 3,912,119 A | 10/1975 | Hill et al. |
| 4,171,822 A | 10/1979 | Thun |
| 4,451,066 A | 5/1984 | Collins |
| 5,288,095 A | 2/1994 | Swindall |
| 5,322,315 A | 6/1994 | Carsten |
| 5,378,008 A | 1/1995 | McCrossen |
| 5,547,210 A * | 8/1996 | Dugger .................... B60D 1/36 280/477 |
| 6,170,852 B1 | 1/2001 | Kimbrough |
| 6,889,994 B1 * | 5/2005 | Birkenbaugh ......... B60D 1/155 280/479.2 |
| 7,398,987 B2 | 7/2008 | Roe et al. |
| 7,497,459 B2 | 3/2009 | Johnson et al. |
| 7,850,193 B2 * | 12/2010 | Williams, Jr. ........... B60D 1/02 280/507 |
| 8,210,560 B2 | 7/2012 | Shaw |

(Continued)

*Primary Examiner* — Joseph M Rocca
*Assistant Examiner* — Marlon Alexander Arce
(74) *Attorney, Agent, or Firm* — John V. Stewart

(57) ABSTRACT

At a given insertion depth (D) of a drawbar (22, 60) in a trailer hitch receiver tube (24, 68), a pin arm (26, 56, 74) attached to the drawbar extends forward beside the receiver tube and holds a captive pin (21, 51, 76) beside a pin receiving hole (30, 71) in the receiver tube. A spring (36) urges the captive pin into the pin receiving hole to retain the drawbar in the receiver tube. The pin arm may be attached to the drawbar via a crossbar (40, 70, 73). Receiver tubes of different sizes (24, 68) may be accommodated by a drawbar size adapter (62) that slips over the drawbar, enlarging it, and by a vertical adjustment mechanism (83) for the pin arm (74) that aligns the pin with the pin receiving hole in either a smaller (24) receiver tube or a larger (68) receiver tube.

18 Claims, 7 Drawing Sheets

(56) References Cited

U.S. PATENT DOCUMENTS

| | | |
|---|---|---|
| 8,833,791 B2 | 9/2014 | Prescott et al. |
| 2009/0140024 A1 | 6/2009 | McLemore et al. |
| 2013/0032621 A1 | 2/2013 | Bogoslofski et al. |
| 2016/0059648 A1 | 3/2016 | Harper |
| 2017/0057310 A1 | 3/2017 | Smith et al. |

\* cited by examiner

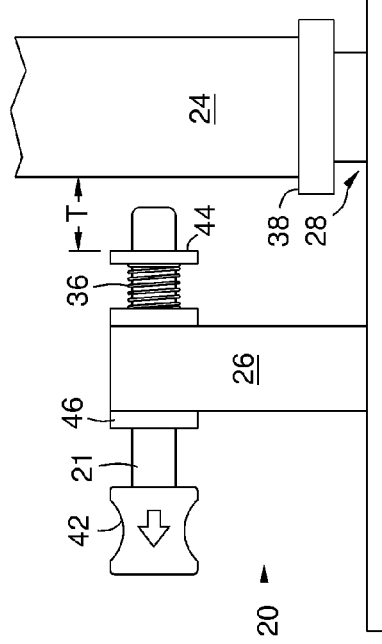
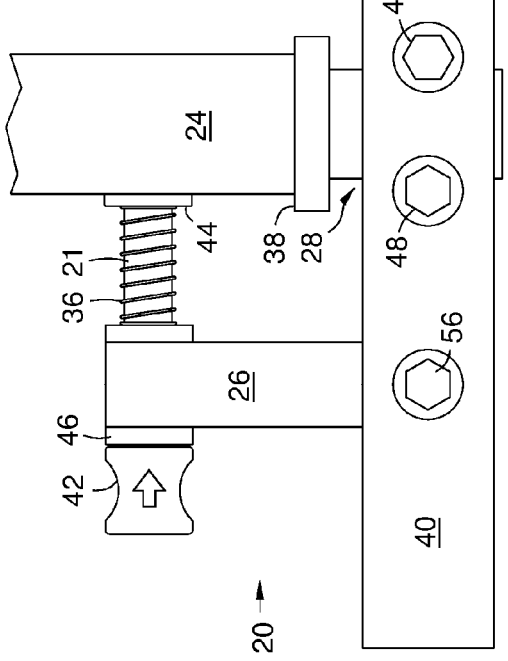

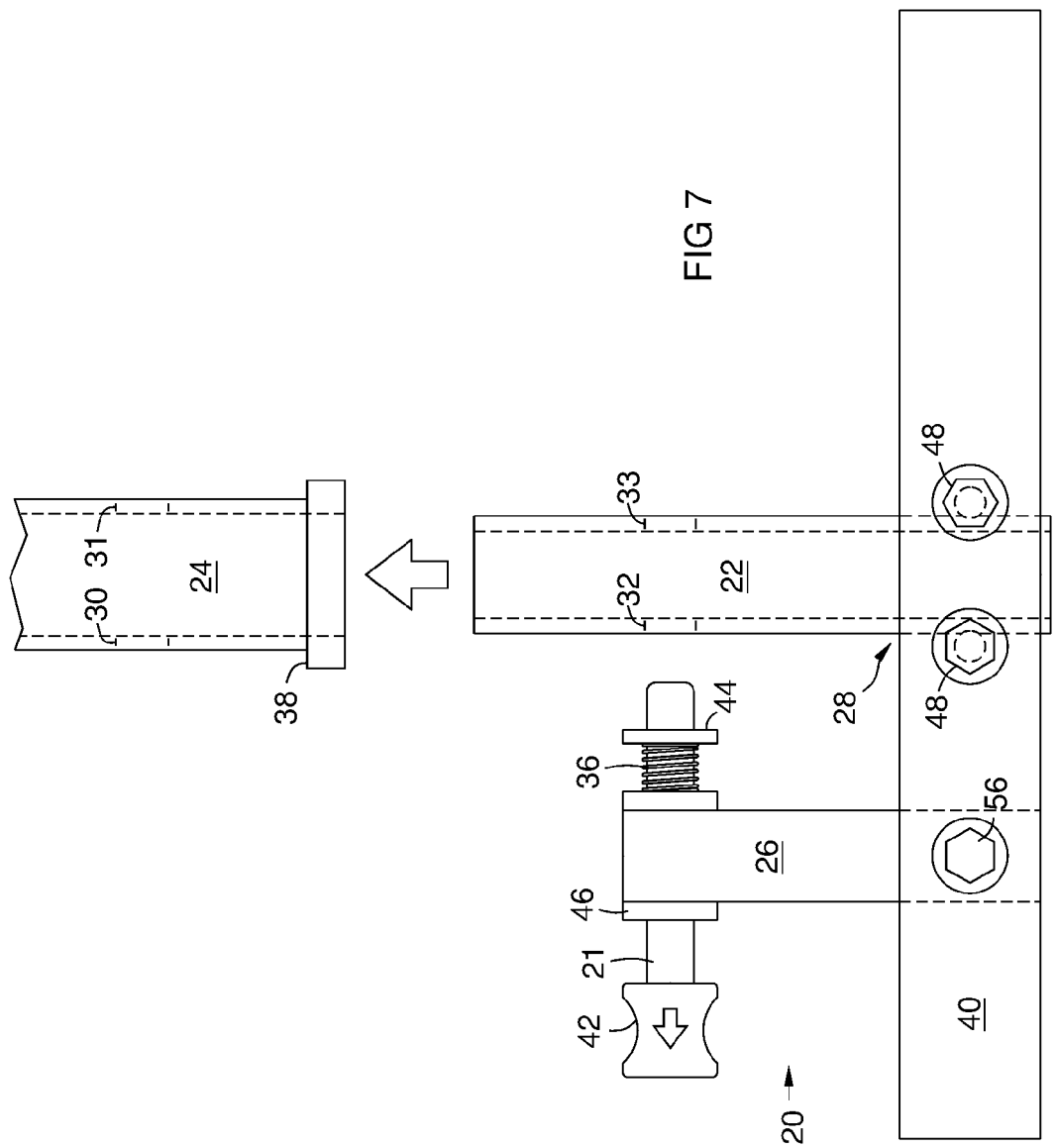

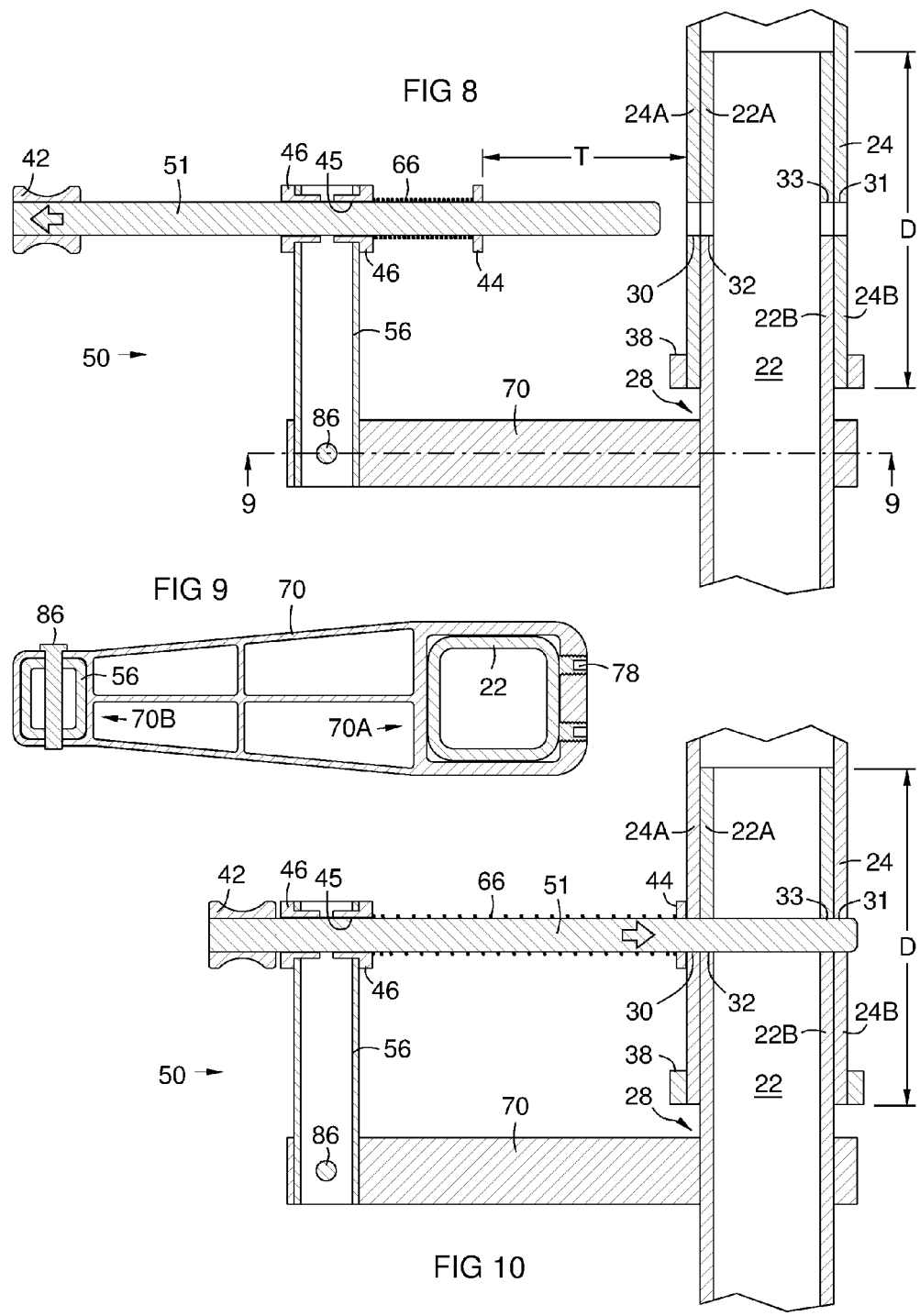

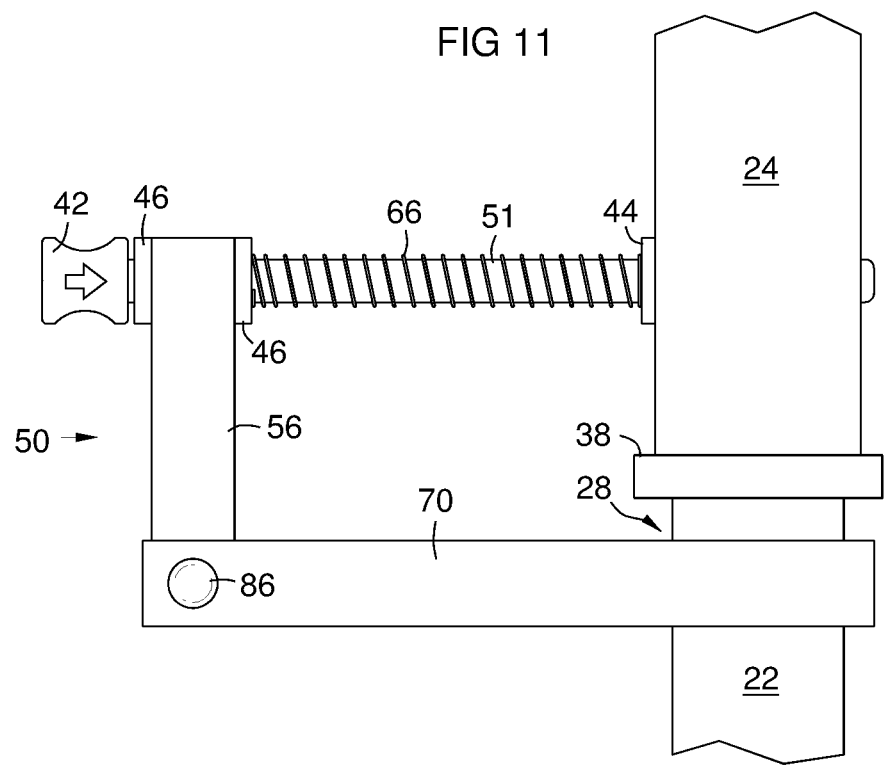

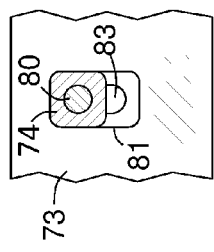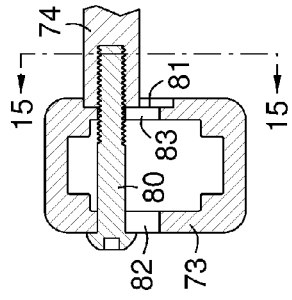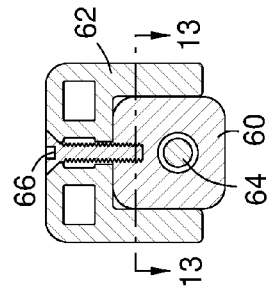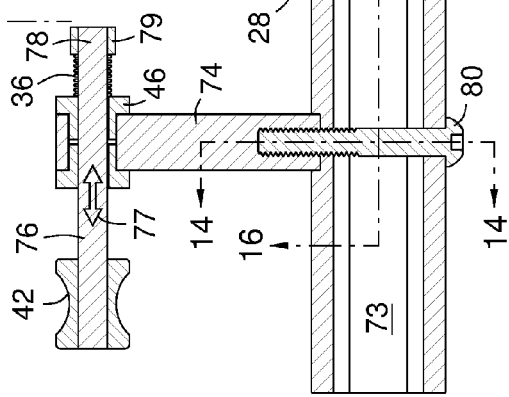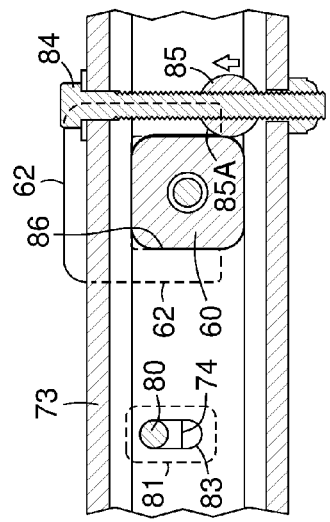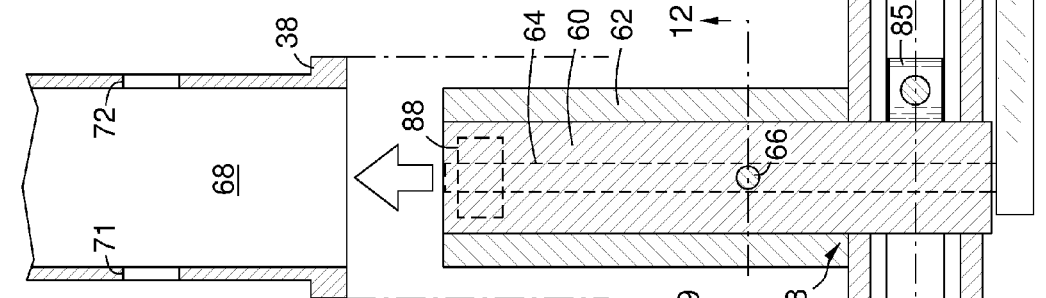

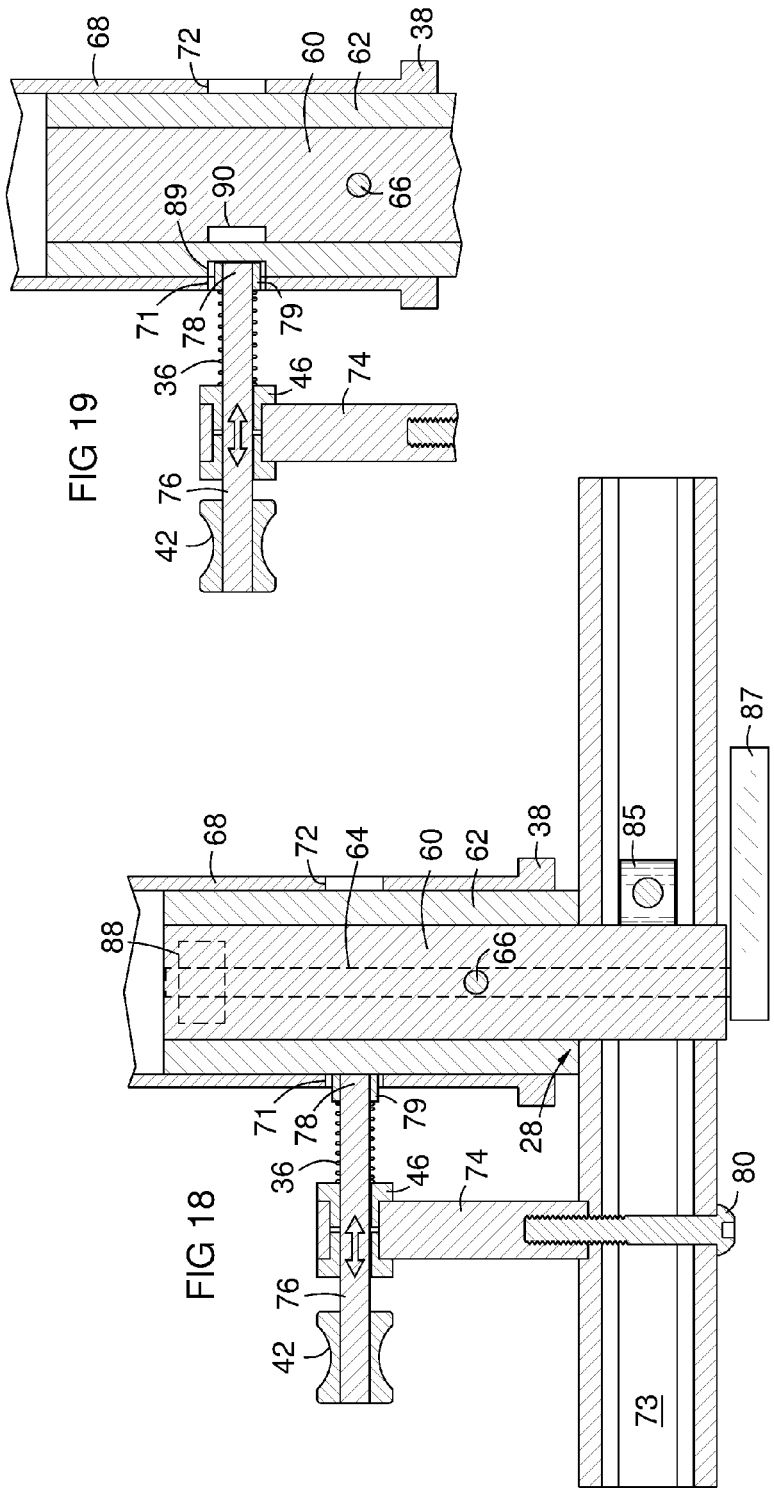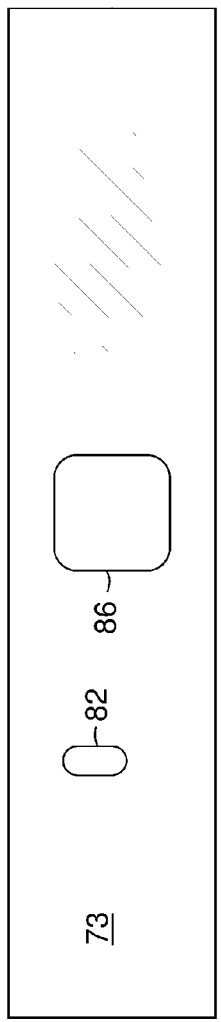

CAPTIVE PIN APPARATUS FOR RETENTION OF A DRAWBAR IN A TRAILER HITCH RECEIVER

CROSS-REFERENCE TO RELATED APPLICATIONS

This application is a continuation in part of U.S. patent application Ser. No. 15/494,808 filed Apr. 24, 2017, and U.S. Ser. No. 15/721,770 filed Sep. 30, 2017, and U.S. Ser. No. 15/396,710 filed Jan. 2, 2017, all of which are incorporated by reference herein.

FIELD OF THE INVENTION

This invention relates to retention of a drawbar in a trailer hitch receiver tube, and particularly to a slidable captive pin that automatically slides into the pin receiving hole in the receiver tube when the drawbar is inserted therein.

BACKGROUND OF THE INVENTION

A common type of trailer hitch provides a receiver tube attached to the back end of a motor vehicle frame or chassis below the bumper. A drawbar is inserted into the receiver tube and is retained therein by a pin that extends horizontally through the sides of the receiver tube and drawbar. The pin may be held by a cotter pin or other means. The drawbar can have a ball for towing a trailer, or it may be attached to an accessory such as a bicycle carrier to be attached to the vehicle.

Inserting the drawbar requires reaching under the bumper to hold the pin and push it inward with one hand while pushing the drawbar into the receiver tube with the other hand until the holes in the drawbar and the tube align and the pin slides through them. For subsequent use, one can mark the drawbar at the insertion depth of hole alignment. However, an accessory such as a bike carrier attached to the drawbar can interfere with a user inserting the pin while reaching around or through the accessory, creating an awkward body position.

SUMMARY OF THE INVENTION

According to one aspect there is provided apparatus that retains a drawbar in a trailer hitch receiver tube, comprising a captive pin that is slidable into and out of a transverse pin receiving hole in the receiver tube. The captive pin is retained in a pin arm attached to the drawbar. At a given insertion depth of the drawbar in the receiver tube, the pin arm extends forward beside the receiver tube and aligns the captive pin with the pin receiving hole in the receiver tube. The captive pin slides into the pin receiving hole under force of a spring. The captive pin has a range of linear motion in the pin arm sufficient to clear the receiver tube and any reinforcing ring on a back end thereof during insertion of the drawbar in the receiver tube.

According to another aspect there is provided a pin arm attached to a drawbar via a crossbar at an attachment point behind a particular insertion depth of the drawbar in the receiver tube, at which depth the pin arm extends forward beside the drawbar to a position beside the pin receiving hole in the receiver tube. A captive pin on the pin arm slides into the pin receiving hole in the receiver tube and is urged by a spring into the pin receiving hole in the receiver tube. The captive pin has a range of movement that includes insertion of the pin into the pin receiving hole in the drawbar and retraction sufficient to clear the receiver tube and any reinforcing ring on a back end thereof when the drawbar is inserted into the receiver tube. During insertion of the drawbar into the receiver tube the pin falls into the pin receiving hole in the receiver tube. It may also fall further into a pin receiving hole in the drawbar, if any, by alignment of the pin receiving hole in the receiver tube and the pin receiving hole in the drawbar at the particular insertion depth.

BRIEF DESCRIPTION OF THE DRAWINGS

The invention is explained in the following description in view of the drawings that show:

FIG. 5 is a top view of the apparatus of FIG. 1 with the pin retracted.

FIG. 6 is a top view of the apparatus of FIG. 1 with the pin engaged.

FIG. 7 is a top view of the apparatus of FIG. 1 during insertion of the drawbar into a trailer hitch receiver tube.

FIG. 8 is a top sectional view of an after-market embodiment of the invention.

FIG. 9 is a sectional view of an attachment bracket taken on line 9-9 of FIG. 8.

FIG. 10 is a top sectional view of the apparatus of FIG. 8 with the pin engaged.

FIG. 11 is a top view of the apparatus of FIG. 10.

FIG. 12 is a sectional view taken on line 12 of FIG. 13 through a 1.25 inch drawbar with a drawbar size adapter for a 2 inch trailer hitch receiver.

FIG. 13 is a top sectional view taken on line 13-13 of FIG. 12, showing the drawbar in the size adapter being inserted into a 2-inch receiver tube.

FIG. 14 is a sectional view of the pin arm attached to a crossbar taken on line 14-14 of FIG. 13.

FIG. 15 is sectional view taken on line 15-15 of FIG. 14, including a portion of the front surface of the crossbar.

FIG. 16 is a back sectional view through the crossbar taken on line 16-16 of FIG. 13, showing a mechanism for attaching the drawbar to the crossbar.

FIG. 17 is a back view of the crossbar.

FIG. 18 is a top sectional view as in FIG. 13, showing the drawbar and the 2-inch size adapter inserted into a 2-inch receiver tube.

FIG. 19 is a partial top sectional view as in FIG. 18 showing an optional depression in the drawbar size adapter for the inner end of the pin.

DETAILED DESCRIPTION OF THE INVENTION

Figure 1:
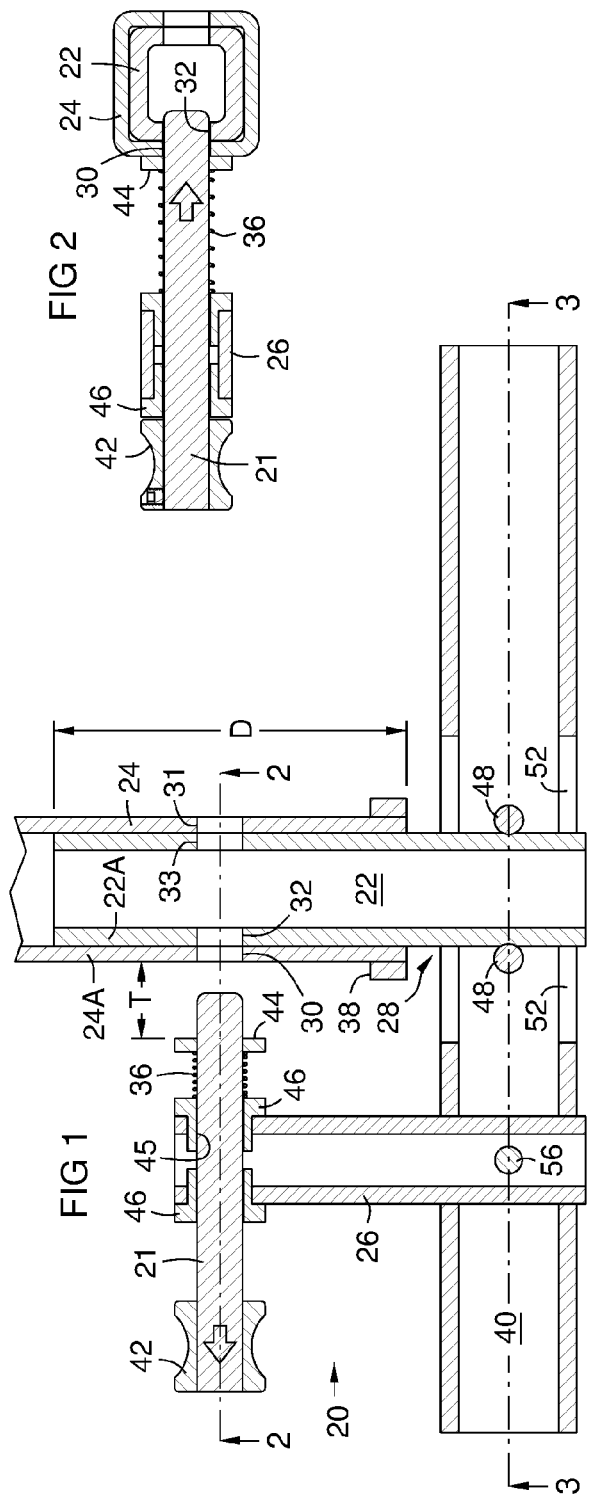
FIG. 1 is a top sectional view taken on line 1-1 of FIG. 3 showing a captive pin apparatus with the pin retracted showing aspects of an embodiment of the invention.

FIG. 1 shows an apparatus 20 with a captive sliding pin 21 that retains a drawbar 22 in a trailer hitch receiver tube 24. A pin arm 26 is attached to the drawbar at an attachment point 28 behind a given insertion depth D of the drawbar into the receiver tube. The pin arm may be attached to the drawbar by a crossbar 40 as shown. The insertion depth is the depth at which the captive pin aligns with a pin receiving hole 30 in the hitch receiver tube 24. It may further align with a pin receiving hole 32 in the drawbar. The pin arm extends forward beside the drawbar to hold the pin 21 beside the pin receiving hole 30 in the receiver tube. The pin is urged into the pin receiving hole in the receiver tube by a spring 36. The pin has a range of movement T that includes inserting the pin into the pin receiving hole in the receiver tube, and retraction sufficient to clear the wall of the receiver tube 24 when the drawbar is inserted into the receiver tube. This includes clearing any reinforcement ring 38 or flange on the back end of the receiver tube. During insertion of the drawbar into the hitch receiver tube the pin falls into the hole 30 in the receiver tube and may further slide into the hole 32 in the drawbar, if any. The two holes 30 and 32 may be aligned with each other when the drawbar is inserted into the receiver tube to the given insertion depth D of the drawbar. The drawbar 22 may be hollow as shown or it may be solid.

A knob 42 allows manual retraction of the pin, and also retains the pin on the pin arm 26, preventing inward escape of the pin from the pin arm. A washer 44 can be pressed onto the pin 21 to retain the spring 36 on the pin and to prevent outward escape of the pin from the pin arm 26. Alternately, a circlip, flange, or sleeve may be used. The pin is laterally slidable in a hole 45 in the pin arm 26. Bushings 46 such as bronze may provide the pin mounting hole with durable low friction material.

The pin arm 26 may be attached to the drawbar by a crossbar 40, which may be for example a structural member of a bike carrier or other non-wheeled accessory to be attached to a motor vehicle via a hitch receiver on the vehicle. In the shown embodiment, the pin 21 only passes through one sidewall 24A of the receiver tube and the adjacent sidewall 22A of the drawbar. However, for a wheeled trailer, the pin may pass through both sides of the hitch receiver tube 24 and the drawbar 22 as later shown to support substantial shear stress. The crossbar 40 may be assembled to the drawbar 22 and the pin arm 26 with bolts 48, 56, and slots 52, or with a bolt and wedge as later described.

Figure 2:
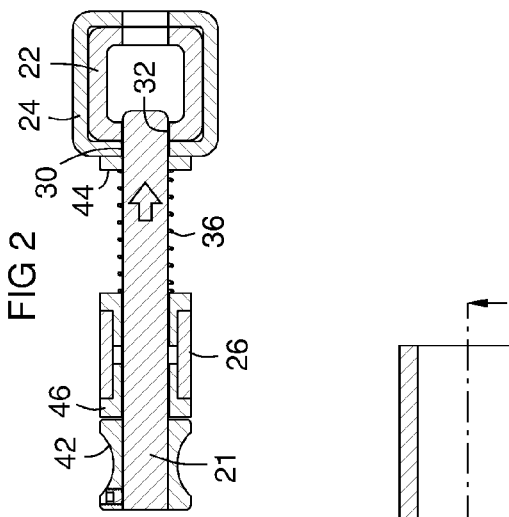
FIG. 2 is a sectional view of the pin taken on line 2-2 of FIG. 1 with the pin engaged.

FIG. 2 is a sectional view taken on line 2-2 of FIG. 1, showing the pin translated inward by the spring 36 into the pin receiving hole 30 in a sidewall 24A the hitch receiver tube and a corresponding pin receiving hole 32 in an adjacent sidewall 22A of the drawbar 22. Inward pin movement can be stopped by the washer 44 and/or the knob 42. Herein "translation" means linear displacement as used in mechanics and mathematics. Herein "inward" means toward the drawbar, "outward" means away from the drawbar, "the outer end of the pin" means the end farthest from the drawbar, and "the inner end of the pin" means the end nearest the drawbar.

Figure 3:
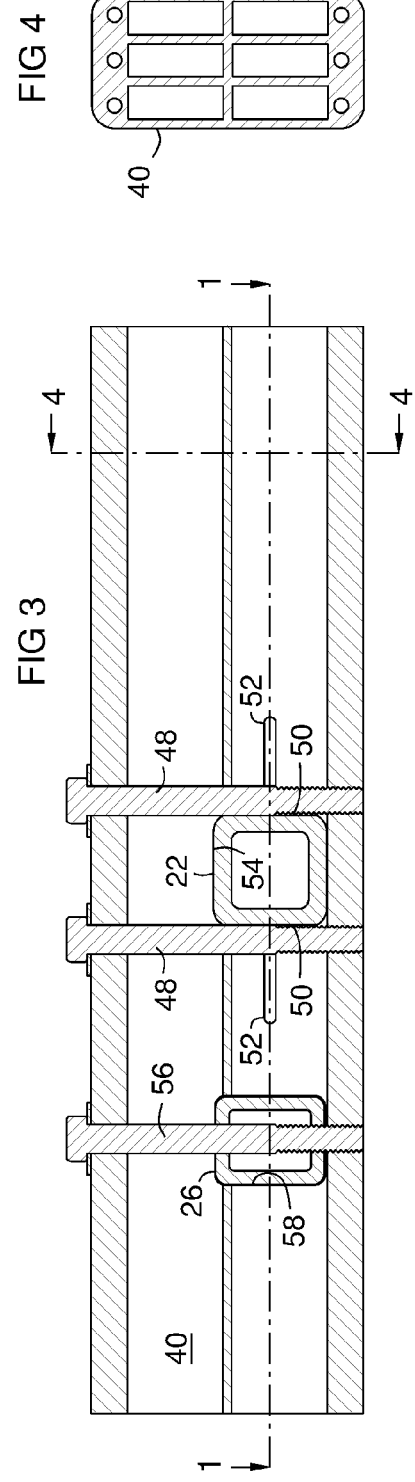
FIG. 3 is a sectional view taken on line 3-3 of FIG. 1 showing a structural member of an accessory such as a bike carrier to which the captive pin is attached on an arm.

FIG. 3 is a sectional view taken on line 3-3 of FIG. 1, showing the crossbar 40. It may be welded to the drawbar 22 and the pin arm 26. Alternately, it can be attached to the drawbar with bolts as shown or with a bolt and wedge as later shown. For example, two bolts 48 may pass vertically through the crossbar 40 and bracket the drawbar with interference provided by shallow vertical channels 50 in the sides of the drawbar. The interference holds the drawbar in the crossbar even if the bolts are loose. Compressible slots 52 may be extend from the sides of the opening 54 in the crossbar that receives the drawbar 22. This causes the opening 54 to clamp the drawbar firmly when the bolts 48 are tightened. A vertical bolt 56 may be used to attach the pin arm 26 to the crossbar 40. It may pass through the pin arm with clearance, and the opening 58 for the pin arm may also have clearance, so the forward end of the pin arm can move vertically within a limited range such as at least 0.1 inch (2.5 mm) allowing the pin to find the pin receiving hole in the hitch tube within a given vertical tolerance.

Figure 4:
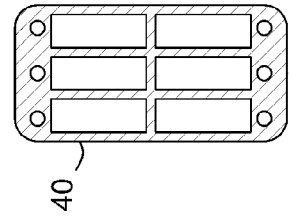
FIG. 4 is a side sectional view taken on line 4-4 of FIG. 3.

FIG. 4 is a sectional view taken on line 4-4 of FIG. 3 illustrating an extrusion shape that may be used for the crossbar 40. FIG. 5 is a top view of the apparatus of FIG. 1 with the pin retracted. FIG. 6 is a top view of the apparatus of FIG. 1 with the pin inserted. FIG. 7 is a top view of the apparatus of FIG. 1 during insertion of the drawbar 22 into a trailer hitch receiver tube 24.

FIG. 8 is a top sectional view of an after-market embodiment 50 of the invention that can be attached to an existing drawbar by an end user. It has the same primary features as the embodiment of FIGS. 1-7. The crossbar is embodied as a laterally extending support bracket 70 that attaches to the drawbar 22 to hold the pin arm 56. The captive pin 51 may extend through holes 30, 31 in both sides 24A, 24B of the hitch receiver tube 24 and through aligned holes 32, 33 in both sides 22A, 22B of the drawbar 22 to support towing. The pin 51 is longer in this embodiment than previously shown, and the pin arm 56 is farther from the drawbar 22 to support greater pin movement range T. The spring 66 is longer. A bolt or fixed pin 86 may be used to attach the pin arm 56 to the support bracket 70.

FIG. 9 is a sectional view of the support bracket 70 taken on line 9-9 of FIG. 7. The support bracket 70 may have a first receptacle 70A that receives the drawbar 22. Setscrews 98 may be used to fix the drawbar 22 in the receptacle 70A. The support bracket 70 may have a second receptacle 70B that receives the pin arm 56. A bolt or fixed pin 86 may be used to retain the pin arm 56 in the second receptacle 70B. The bolt or fixed pin 86 and the second receptacle 70B may provide clearance for the pin arm 56 that allows vertical movement for the front end of the pin arm 56 within a limited range such as 0.1 inch (2.5 mm), so the pin 51 can find the pin receiving hole 30 in the hitch receiver tube 24 with allowance for manufacturing tolerances.

FIG. 10 is a top sectional view of embodiment 50 with the pin 51 engaged through pin receiving holes 30, 31 in both sides 24A, 24B of the hitch receiver tube 24 and pin receiving holes 32, 33 in both sides 22A, 22B of the drawbar 22 for towing a trailer with the drawbar 22. Alternately, the drawbar may be solid with the pin all the way through. FIG. 11 is a top external view of the apparatus of FIG. 10.

FIG. 12 is a sectional view taken on line 12 of FIG. 13 through a 1.25 inch drawbar 60 with a drawbar size adapter 62 for a 2-inch trailer hitch receiver. The size adapter comprises a channel with an inverted U-shaped cross section that slips over the drawbar. A machine screw 66 may attach the size adapter 62 to the drawbar 60. The drawbar may have a longitudinal translation screw 64 operated by a lever 87 (FIG. 13) that pulls a wedge 88 along a ramp at the back end of the drawbar to tighten the drawbar in the receiver tube as shown in U.S. patent application Ser. No. 15/396,710 of the present inventor.

FIG. 13 is a top sectional view taken on line 13-13 of FIG. 12, showing the drawbar 60 in the size adapter 62 being inserted into a 2-inch receiver tube 68 with lateral pin receiving holes 71, 72 for a conventional retainer pin. A crossbar 73 is attached transversely to the drawbar 60 at a point 28 behind an insertion depth of the drawbar into the receiver tube as previously described. A pin arm 74 is attached to the crossbar, and extends forward therefrom to hold a captive pin 76 at a position beside the pin receiving hole 71 in the receiver tube 68 when the drawbar is inserted therein. The captive pin is linearly slidable 77 in the forward end of the pin arm so that an inner end 78 of the captive pin slides into and out of the hole 71 in the receiver tube 68. The captive pin 76 has enough range of motion 77 to clear a reinforcing ring 38 at the back end of the receiver tube 68.

A compression spring 36 may be retained between the pin arm 74 or a bushing 46 therein and a short sleeve 79 on the inner end 78 of the captive pin. The sleeve 79 fits into the pin receiving hole 71 with enough clearance for easy insertion. The sleeve 79 has an outer diameter that is less than the inner diameter of the pin receiving hole 71. The outer diameter of the sleeve may be at least as large as a mean diameter of the compression spring. In this embodiment, the spring retainer 79 does not stop on the outer surface of the receiver tube 68. Instead, the inner end 78 of the captive pin stops against the size adapter 62 as later shown, or it stops against the drawbar 60 when the adapter is not used. The pin arm 74 may be attached to the crossbar 73 by a bolt 80 through the crossbar threaded into the back end of the pin arm.

FIG. 14 is a sectional view of the crossbar 73 taken on line 14-14 of FIG. 13. The bolt 80 pulls the pin arm 74 against a depression 81 in the front surface of the crossbar. The pin arm may have one or more flat sides, for example it may have a square cross section. Sides of the depression may index the pin arm rotationally. A vertical adjustment mechanism for the pin arm may comprise vertical slots 82, 83 provided for the bolt 80 in the crossbar to allow vertical repositioning of the pin arm 74 downward for a 1.25 inch receiver tube, or upward as shown for a 2 inch receiver tube when using the size adapter 62. Instead of the slots 82, 83, alternately selectable upper and lower holes (not shown) may be provided for the bolt.

In an alternate embodiment not shown, the pin arm 74 can be mounted halfway between the upper and lower positions via a single bolt hole without a vertical slot 83 or a depression 81. With the bolt loosened, the pin arm can be turned slightly about the bolt axis to angle the inner end of the pin upward to enter the pin hole 71 of the 2 inch receiver tube or angled downward to enter pin hole 30 (FIG. 1) of the 1.25 inch receiver tube. Although this embodiment does not exactly align the captive pin horizontally aligned with the pin receiving holes 30, 70, enough diametric clearance can be provided between the sleeve 79 and each of the holes so the inner end of the pin can fall into the respective hole.

FIG. 15 is sectional view taken on line 15-15 of FIG. 14, including a portion of the front surface of the crossbar 73 showing the pin arm 74 mounted at the top end of the depression 81.

FIG. 16 is a back sectional view through the crossbar 73 taken on line 16-16 of FIG. 13, showing a mechanism for attaching the drawbar 60 to the crossbar 73. The drawbar passes through a horizontal hole 86 through the crossbar 73. A single bolt 84 is journaled vertically through unthreaded holes the crossbar. The bolt passes beside the drawbar, and is threaded into a wedge 85 inside the crossbar below and beside the drawbar. Tightening the bolt draws the wedge upward, wedging the drawbar is tightly between a ramp surface 85A of the wedge and an opposite side of the hole 86 through the crossbar that receives the drawbar. The ramp surface 85A provides the mechanical advantage of a ramp. The bolt can flex, providing a spring force of the ramp against the drawbar. These factors reduce the bolt torque requirement while maintaining a consistent wedge force over time. This mechanism is further described in U.S. patent application Ser. No. 15/494,808 of the present inventor. This mechanism requires minimal hardware and no welding. The wedge may be a simple cylinder as shown, or a triangular or other wedge shaped extrusion. The shown cylinder embodiment uses a cylindrical side surface 85A of the cylinder as the ramp. After the wedge is tightened, a locknut may be tightened on the bottom end of the bolt 84 against the bottom of the crossbar to prevent loosening.

FIG. 17 is a back view of the crossbar, showing the hole 86 for the drawbar and the vertical slot 82 for the bolt that holds the pin arm.

FIG. 18 is a top sectional view taken as in FIG. 13, showing the drawbar 60 with the 2-inch size adapter 62 inserted into the 2-inch receiver tube 68 until the captive pin 76 aligns with the hole 71 in the receiver tube. The inner end 78 of the pin falls into the hole 71. At this time, the drawbar may be tightened into to the receiver tube by turning the lever 87 to move the wedge 88 via the translation screw 64. Even if the drawbar is inserted too far in the receiver tube and the lever 87 is not tightened, the pin will fall into the hole 71 and retain the drawbar in the receiver tube. Even if the drawbar is not inserted far enough in the receiver tube and the lever 87 is not tightened, the pin will catch behind the reinforcing ring 38 of the drawbar, and retain the drawbar in the receiver tube. However, the lever should be tightened after the inner end 78 of the captive pin falls into the hole 71 in the receiver tube.

The drawbar 60 and the adapter 62 may not have a pin receiving hole. This allows the inner end 78 of the captive pin, to stop against the drawbar or adapter, eliminating the need for a washer or flange 44 (FIG. 1) on the pin to stop against the outer surface of the receiver tube, while still allowing the pin to operate on either a 1.25 inch or 2 inch receiver tube. Another benefit of this design is elimination of the thickness of a washer or flange 44 (FIG. 1) from the overall length of the pin including the required spring length for sufficient movement of the pin to operate with both a 1.25 inch drawbar and a 2 inch drawbar.

FIG. 19 is a partial top sectional view as in FIG. 18 showing an optional depression 89 in the size adapter 62 and an optional depression 90 the drawbar 60 for the inner end 78 of the captive pin. These provide additional strength of retention of the size adapter or the drawbar 80 in the receiver tube when the hole 71 aligns with the depression 89 or the hole 30 of a 1.25 inch drawbar (FIG. 1) aligns with the depression 90. The depression may limited in depth so that the inner end 78 of the pin stops against the bottom of the depression and the spring retention sleeve 79 at least reaches, or preferably only reaches, the outer surface of the receiver tube as shown.

The invention provides fast and convenient coupling of a drawbar to a trailer hitch receiver for mounting an accessory to a motor vehicle or for towing a trailer. The pin cannot be lost since it is attached to the drawbar. It falls automatically into pin receiving hole in the receiver tube during insertion of the drawbar into the receiver tube.

Embodiments of the present invention shown and described herein are provided by way of example. Variations and substitutions may be made without departing from the invention. Accordingly, it is intended that the invention be limited only by the appended claims.

The invention claimed is:

1. A captive pin apparatus that retains a drawbar in a first trailer hitch receiver tube, the captive pin apparatus comprising;
   a captive pin slidably retained in a pin arm attached to the drawbar at an attachment point behind a given insertion depth of the drawbar into the first receiver tube;

wherein, at the given insertion depth of the drawbar in the first receiver tube, the pin arm extends forward from the drawbar and holds the captive pin beside the first receiver tube;

wherein a spring urges the captive pin toward the first receiver tube; and wherein the captive pin comprises a range of linear motion on the pin arm sufficient for an inner end of the pin to clear a reinforcement ring on a back end of the first receiver tube when the drawbar is inserted into the first receiver tube.

2. The apparatus of claim 1 wherein the spring comprises a compression spring disposed around the captive pin between the pin arm and a spring retainer on an inner end of the captive pin; and wherein, at the insertion depth, the pin arm holds the captive pin beside a pin receiving hole in the first receiver tube.

3. The apparatus of claim 2 wherein:

the spring retainer comprises a sleeve on an inner end of the captive al, the sleeve comprising an outer diameter that is less than an inner diameter of the pin receiving hole; and the inner end of the captive pin slides into the pin receiving hole in the first receiver tube, the inner end of the captive pin stops against the drawbar, and the sleeve extends at least to an outer surface of the first receiver tube.

4. The apparatus of claim 3 wherein, when the inner end of the captive pin is disposed in the pin receiving hole in the first receiver tube, the inner end of the captive pin stops against the drawbar and the sleeve extends only to the outer surface of the first receiver tube.

5. The apparatus of claim 1 further comprising:

a drawbar size adapter that slips over the drawbar and fits an inner dimension of a second receiver tube that is larger than the first receiver tube;

wherein the pin arm is attached to the drawbar by a crossbar that extends laterally from the drawbar, and the pin arm is attached to the crossbar by a mechanism that provides an adjustment of the pin arm to a first position in which an inner end of the captive pin enters a pin receiving hole in the first receiver tube when the drawbar is inserted therein, and a second position in which the inner end of the captive pin enters a pin receiving hole in the second receiver tube when the drawbar with the adapter thereon is inserted in the second receiver tube.

6. The apparatus of claim 5 wherein:

the pin arm adjustment mechanism provides a selectable lower position of the pin arm that holds the captive pin beside the pin receiving hole in the first receiver tube when the drawbar is inserted therein; and the pin arm adjustment mechanism further provides a selectable upper position of the pin arm that holds the captive pin beside the pin receiving hole in the second receiver tube when the drawbar with the adapter thereon is inserted in the second receiver tube.

7. The apparatus of claim 6, wherein the pin arm adjustment mechanism comprises a vertically elongated slot in the crossbar, a bolt through the elongated slot that is threaded into a back end of the pin arm.

8. The apparatus of claim 7, wherein the pin arm adjustment mechanism further comprises a depression in a front surface of the crossbar that rotationally indexes the pin arm relative to the crossbar.

9. The apparatus of claim 5, wherein the pin arm adjustment mechanism comprises turning the pin arm relative to the crossbar to angle the inner end of the pin upward or downward, then tightening a bolt through the crossbar threaded into the pin arm.

10. The apparatus of claim 5, wherein the crossbar is attached to the drawbar by a mechanism comprising:

the drawbar inserted through a horizontal hole in the crossbar;

a vertical bolt through the crossbar beside the drawbar; and a wedge threaded onto the bolt inside the crossbar, below and beside the drawbar;

wherein tightening the bolt draws the wedge upward, wedging a ramp surface of the wedge against a side of the drawbar, forcing the drawbar against an opposite side of the horizontal hole in the crossbar.

11. A captive pin apparatus that retains a drawbar in a trailer hitch receiver tube, the captive pin apparatus comprising;

a captive pin linearly slidably mounted on a pin arm attached to the drawbar by a crossbar;

wherein, at a given insertion depth of the drawbar in the receiver tube, the pin arm extends forward beside the receiver tube and holds the captive pin beside a pin receiving hole in the receiver tube; and a vertical position adjustment mechanism of the pin arm on the crossbar;

wherein a spring between the captive pin and the pin arm urges the captive pin into the pin receiving hole in the receiver tube at the given insertion depth, retaining the drawbar in the receiver tube; and wherein the captive pin is provided with a range of motion on the pin arm that includes insertion of the captive pin into the pin receiving hole in the drawbar and retraction sufficient for an inner end of the pin to clear an outer surface of the trailer hitch receiver tube and a reinforcement ring on a back end thereof when the drawbar is inserted into the trailer hitch receiver tube.

12. The apparatus of claim 11 wherein the crossbar comprises a structural member of a non-wheeled accessory to be attached to a motor vehicle via the trailer hitch receiver tube.

13. The apparatus of claim 11 wherein the range of motion of the captive pin is limited by a washer or flange on an inner end of the captive pin stopping against an outer surface of the receiver tube and allowing an insertion depth of the captive pin through only one sidewall of the trailer hitch receiver tube and one adjacent sidewall of the drawbar.

14. The apparatus of claim 11, wherein the crossbar comprises a laterally extending support bracket comprising a first receptacle that slides over the drawbar, and one or more machine screws that tighten against the drawbar, fixing the laterally extending support bracket to the drawbar.

15. The apparatus of claim 14, wherein the captive pin and the laterally extending support bracket are dimensioned to provide clearance between an inner end of the captive pin and a reinforcing ring on a back end of the trailer hitch receiver tube in a retracted position of the captive pin.

16. The apparatus of claim 15, wherein the pin arm is inserted into a second receptacle of the laterally extending support bracket and is retained therein by one or more fixed pins or a further one or more machine screws.

17. The apparatus of claim 16, wherein said one or more fixed pins or said further one or more machine screws pass through respective holes or channels in the pin arm, wherein said holes or channels in the pin arm each provide at least 0.02 inches (0.5 mm) of diametric clearance for the respective machine screws or pins, providing the pin arm with a range of vertical play so the captive pin can align vertically with the pin receiving hole in the trailer hitch receiver tube.

18. The apparatus of claim 16, wherein said one or more fixed pins or said further one or more machine screws pass through respective holes or channels in the pin arm, wherein said holes or channels in the pin arm each provide a clearance for the respective pins or machine screws that provides at least 0.1 inch (2.5 mm) of vertical play at the front end of the pin arm so the captive pin can align vertically with the pin receiving hole in the trailer hitch receiver tube.

\* \* \* \* \*